United States Patent Office 2,960,527
Patented Nov. 15, 1960

2,960,527
PROCESS FOR THE PREPARATION OF DICHLORO PHOSPHORIC ESTERS

Herbert Grunze, Berlin-Altglienicke, and Erich Thilo, Berlin-Adlershof, Germany, assignors to Deutsche Akademie der Wissenschaften zu Berlin, Berlin-Adlershof, Germany No Drawing. Filed May 11, 1959, Ser. No. 812,105

Claims priority, application Germany Aug. 20, 1958

9 Claims. (Cl. 260—461)

The present invention relates to the preparation of dichloro phosphoric esters of the formula $ROPOCl_2$.

Up to the present, only some aliphatic alcohols have been converted into dichloro phosphoric esters, viz. methanol, ethanol, chloroethanol, and n-butanol. In most cases, the alcohols were reacted with phosphorus oxychloride. In a few cases only were dichloro phosphoric esters prepared by chlorination of secondary monochloro phosphorous esters $(RO)_2PCl$ with alkyl chloride cleavage, or in another method, by reacting tertiary phosphoric esters with phosphorus oxychloride. In both cases, the yields were very poor. (See G. N. Kosapoloff, "Organophosphorus Compounds," John Wiley and Sons, Inc., New York, 1950.)

When alcohols are reacted with phosphorus oxychloride, hydrogen chloride is set free which has to be carefully removed by evacuation or by the passage of an inert gas through the reaction vessel, before the dichloro phosphoric esters formed in the reaction are distilled; otherwise, the esters are decomposed by the HCl with alkyl-chloride formation. When secondary or tertiary alcohols are reacted with phosphorus oxychloride, alkyl chloride formation is the main reaction. It was, therefore, not possible, up to the present, to prepare dichloro phosphoric esters of secondary or tertiary alcohols.

It is the object of the present invention to provide a process of preparing dichloro phosphoric esters of primary as well as secondary and tertiary aliphatic alcohols by a simple operation.

It is another object of the invention to prepare the dichloro phosphoric esters of the above mentioned alcohols in yields which will make the esters available at comparatively low costs and render the preparation more economical than it was hitherto possible. This will then make the esters useful as starting materials, for instance in the plastics, dyes, and insecticide industries.

Further objects and advantages will become apparent from the following detailed description.

In contradistinction to methods hitherto known, the process according to the invention uses for esterification pyrophosphoryl chloride of the formula $P_2O_3Cl_4$. The reaction between the alcohol chosen for esterification and the pyrophosphoryl chloride proceeds quantitatively at low temperatures according to the following equation $$P_2O_3Cl_4 + ROH \rightarrow ROPOCl_2 + HOPOCl_2$$

This means that the alcohol and the pyrophosphoryl chloride will react with splitting of the P—O—P linkage so as to yield 1 mol of dichloro phosphoric ester and 1 mol of dichloro phosphoric acid. HCl formation is completely avoided in this reaction. The dichloro phosphoric ester formed in the reaction is separated from dichloro phosphoric acid by distillation in vacuo and recovered in very pure state by a second distillation.

Some of the dichloro phosphoric esters made by the novel process are, for instance, the dichloro phosphoric ester of methanol of the formula $CH_3OPOCl_2$, of ethanol, $C_2H_5OPOCl_2$, of n-propanol $C_3H_7OPOCl_2$, of iso-propanol iso-$C_3H_7OPOCl_2$, and of n-butanol $C_4H_9OPOCl_2$.

In the following, the invention will be more fully described in a number of examples, but it should be understood that these are given by way of illustration and not of limitation and that many changes in the details may be made without departing from the spirit of the invention.

EXAMPLE 1

*Preparation of methyldichloro phosphate $CH_3OPOCl_2$*

40.06 g. $P_2O_3Cl_4$ (0.159 mol) were cooled down to $-40°$ C. and 5.10 g. $CH_3OH$ (0.159 mol) were slowly added thereto. The exothermic reaction between the pyrophosphoryl chloride and the methanol was started by careful heating to about $+25°$ C. with simultaneous stirring. If the temperature rose too rapidly, the reaction mixture was again cooled for a short time. After about 15 minutes, a homogeneous solution had formed and the reaction was terminated. The mixture of methyl dichloro phosphate and dichloro phosphoric acid obtained by the reaction was distilled at reduced pressure (13 mm.) and the collected distillate was re-distillated for removal of small impurities. Obtained were 22.85 g. pure methyldichloro phosphate (B.P. 49° C./13 mm.) i.e. 48.39% of the total phosphorus were obtained in form of methyl-dichloro phosphate. Referring to the above reaction equation, this corresponds to a yield of 96.78%.

P calc.=20.80%; P found=20.88%. Cl calc.=47.62%; Cl found=47.69%. Cl:P=1.996.

EXAMPLE 2

*Preparation of ethyldichloro phosphate $C_2H_5OPOCl_2$*

37.77 g. $P_2O_3Cl_4$ (0.15 mol) were reacted with 8.29 g. $C_2H_5OH$ (0.18 mol) in an analogous manner to the one described in the preparation of methyldichloro phosphate and the mixture obtained in the reaction containing ethyldichloro phosphate and dichloro phosphoric acid was distilled at reduced pressure (13 mm.) as described in Example 1. After repeated distillation, 24.28 g. ethyldichloro phosphate (B.P. 58° C./13 mm.) were obtained, that is to say 49.67% of the total phosphorus were reacted, which with reference to the equation correspond to a yield of 99.34%.

P calc.=19.01%; P found=18.91%. Cl calc.=43.52%; Cl found=43.33%. Cl:P=2.002.

EXAMPLE 3

*Preparation of n-butyldichloro phosphate n-$C_4H_9OPOCl_2$*

26.90 g. $P_2O_3Cl_4$ (0.107 mol) were reacted with 11.88 g. n-$C_4H_9OH$ (0.160 mol) in an analogous manner to the one described in the preparation of methyldichloro phosphate and the resulting reaction mixture of n-butyldichloro phosphate, dichloro phosphoric acid and n-butanol was distilled as described in Example 1, at reduced pressure of 13 mm.

After the second distillation, we obtain 15.43 g. n-butyldichloro phosphate (B.P. 84° C./13 mm.) i.e. 37.27% of the total phosphorus. Yield: 74.54%.

P calc.=16.22%; P found=15.99%. Cl calc.=37.13%; Cl found=36.60%. Cl:P=2.000.

EXAMPLE 4

*Preparation of n-propyldichloro phosphate* n-$C_3H_7OPOCl_2$ 28.46 g. $P_2O_3Cl_4$ (0.113 mol) were reacted with 11.55 g. n-$C_3H_7OH$ (0.192 mol) in an analogous manner, as described for the preparation of methyldichloro phosphate, and the obtained mixture of n-propyldichloro phosphate, dichloro phosphoric acid and n-propanol distilled at reduced pressure of 13 mm., as described in Example 1. Obtained were 17.74 g. n-propyldichloro phosphate (B.P. 72° C./13 mm.), that is to say 44.20% of the total phosphorus. Consequently, the yield was 88.40%.

P calc.=17.50%; P found=17.45%. Cl calc.= 40.07%; Cl found=39.82%. Cl:P=1.994.

EXAMPLE 5

*Preparation of iso-propyldichloro phosphate* i-$C_3H_7OPOCl_2$ 37.50 g. $P_2O_3Cl_4$ (0.149 mol) were reacted with 16.11 g. i-$C_3H_7OH$ (0.268 mol) in an analogous manner as described for the preparation of methyldichloro phosphate and the obtained mixture of iso-propyldichloro phosphate, dichloro phosphoric acid, and iso-propanol distilled at reduced pressure as described in Example 1. Obtained were 11.80 g. iso-propyldichloro phosphate (B.P. 60° C./12 mm.) that is, 20.03% of the total phosphorus. Yield: 40.06%.

P calc.=17.50%; P found=17.23%. Cl calc.= 40.07%; Cl found=38.81%. Cl:P=1.968.

As a general rule it should be noted that the pyrophosphoryl chloride is first cooled down to about —30° C. to —40° C. before the other reaction component is added. The reaction proper is allowed to proceed at temperatures ranging from —30° C. to +25° C. The reaction time is to a certain degree dependent on the reaction temperature; in general, 10 to 25 minutes will be required for complete conversion.

For the preparation of methyldichloro phosphoric ester $CH_3OPOCl_2$, it is necessary to react the starting components methanol and pyrophosphoryl chloride in molar proportion 1:1, since an excess of methanol would react with dichloro phosphoric acid to form dimethylmonochloro phosphate, at least in part, and this latter compound would then be taken along at the distillation of the dichloro phosphoric ester, because both dimethylmono-chloro and methyl dichloro phosphate have similar boiling points. The dichloro phosphoric ester would thereby be rendered impure.

In the preparation of ethyldichloro phosphoric ester, $C_2H_5OPOCl_2$, 20% excess alcohol is desirable, because this renders the yield in the ester more complete.

In the preparation of higher alkyldichloro phosphates, a 50–100% excess in alcohol is absolutely necessary, because the dichloro phosphoric acid which is formed in the alcoholysis of pyrophosphoryl chloride has to be esterified by the said excess alcohol before the ester is distilled off. If in the reaction of higher alcohols the ratio of the alcohol and the pyrophosphoryl chloride were taken as 1:1, the HCl, liberated during the distillation of dichloro phosphoric ester due to condensation of dichloro phosphoric acid, would cause decomposition of the dichloro phosphoric ester.

As mentioned before, the dichloro phosphoric esters obtained by the process according to the invention, are useful starting materials in a number of chemicals, e.g. in the plastics, dyes, and insecticide industries.

What is claimed is:

1. A process for the preparation of dichloro phosphoric esters of the formula $ROPOCl_2$, wherein R stands for the alkyl radical of a saturated aliphatic alcohol, which comprises, reacting said alcohol in at least molar proportion with pyrophosphoryl chloride according to the equation $$P_2O_3Cl_4 + ROH \rightarrow ROPOCl_2 + HOPOCl_2$$

at temperatures ranging from —30° C. to +25° C., and recovering the dichloro phosphoric ester formed in the reaction by distillation.

2. The process as claimed in claim 1, wherein the reaction is carried out in a period ranging from 10 to 25 minutes.

3. A process for the preparation of dichloro phosphoric esters of the formula $ROPOCl_2$ wherein R stands for the alkyl radical of a saturated aliphatic alcohol, which comprises cooling pyrophosphoryl chloride to a temperature between —30 and —40° C., adding thereto said alcohol while allowing the temperature to rise gradually from —30° C. to +25° C. and recovering the dichloro phosphoric ester formed in the reaction by vacuum distillation.

4. A process according to claim 1, wherein the alcohol is selected from the group consisting of primary, secondary, and teritary saturated aliphatic alcohols.

5. A process for preparing methyldichloro phosphoric ester which comprises reacting methanol and pyrophosphoryl chloride in the molar ratio of 1:1 at about +25° C. for 15 minutes, distilling the methyl ester thus formed from the dichlorophosphoric acid simultaneously formed, under vacuum, and recovering the methyldichloro phosphoric ester in pure state by a second distillation.

6. A process for preparing ethyldichloro phosphoric ester which comprises reacting ethanol and pyrophosphoryl chloride in the molar ratio of about 1.5:1, at about +25° C. for 15 minutes, distilling the ethyl ester thus formed from the dichloro phosphoric acid simultaneously formed, under vacuum, and recovering the ethyldichloro phosphoric ester in pure state by a second distillation.

7. A process for preparing n-propyl dichloro phosphoric ester which comprises reacting n-propanol and pyrophosphoryl chloride in the molar ratio of about 1.5:1 at about +25° C. for 15 minutes, distilling the n-propyl ester thus formed from the dichloro phosphoric acid simultaneously formed, under vacuum, and recovering n-propyldichloro phosphoric ester in pure state by a second distillation.

8. A process for preparing iso-propyl dichloro phosphoric ester which comprises reacting iso-propanol and pyrophosphoryl chloride in the molar ratio of about 1.5–2:1, at about +25° C. for 15 minutes, distilling the iso-propyl ester thus formed from the dichloro phosphoric acid simultaneously formed, under vacuum, and recovering iso-propyldichloro phosphoric ester in pure state by a second distillation.

9. A process for preparing n-butyl dichloro phosphoric ester which comprises reacting n-butanol and pyrophosphoryl chloride in the ratio of about 1.5:1, at about +25° C. for 15 minutes, distilling the n-butyl ester thus formed from the dichloro phosphoric acid simultaneously formed, under vacuum, and recovering n-butyldichloro phosphoric ester in pure state by a second distillation.

No references cited.